United States Patent [19]

Kiendl

[11] Patent Number: 4,747,566
[45] Date of Patent: May 31, 1988

[54] APPARATUS FOR PARTIALLY UNFOLDING SOLAR COLLECTORS

[75] Inventor: Helmut Kiendl, Munich, Fed. Rep. of Germany

[73] Assignee: Messerschmitt-Boelkow-Blohm GmbH, Munich, Fed. Rep. of Germany

[21] Appl. No.: 46,995

[22] Filed: May 5, 1987

[30] Foreign Application Priority Data

May 6, 1986 [DE] Fed. Rep. of Germany ....... 3615264

[51] Int. Cl.$^4$ ................................................ B64G 1/44
[52] U.S. Cl. .................................................... 244/173
[58] Field of Search ........................... 244/158 R, 173; 136/244, 245, 292; 160/135, 229 R

[56] References Cited

U.S. PATENT DOCUMENTS 3,168,135  2/1965  Beifuss .............................. 160/229 R

FOREIGN PATENT DOCUMENTS 120662  10/1984  European Pat. Off. ............ 244/173
167433   1/1986  European Pat. Off. ............ 244/173
3215434  7/1985  Fed. Rep. of Germany .

Primary Examiner—Joseph F. Peters, Jr.
Assistant Examiner—Rodney Corl
Attorney, Agent, or Firm—W. G. Fasse; D. H. Kane, Jr.

[57] ABSTRACT

Foldable panels of a solar collector, for example for a satellite, have a plurality of panel sections hinged to each other. At least one outer panel section of each panel is foldable into a position of about 90° to the yet unfolded panel sections. The power needed for the partial unfolding and subsequent complete unfolding is provided by power storing devices, such as mechanical springs. The inward end, relative to a mounting such as a satellite body, of the outer panel section and an outward end of a further inwardly located panel section, for example the next but one inwardly located panel section, are equipped with rigid stop members extending in an extension of the plane of the respective panel section. The stop member of the outer panel has a cam surface (10) cooperating with a facing surface (12) of the stop member of the inner panel section in such a way that the two stop members will maintain the partially unfolded state in the absence of a further unfolding force application and so that the outer stop member cam surface (10) can clear the facing surface (12) in response to such further unfolding force.

5 Claims, 2 Drawing Sheets

APPARATUS FOR PARTIALLY UNFOLDING SOLAR COLLECTORS

FIELD OF THE INVENTION

The invention relates to an apparatus for partially unfolding solar collectors. More specifically, the invention relates to an apparatus for maintaining the partially unfolded state of solar collector panel sections relative to each other.

DESCRIPTION OF THE PRIOR ART

Devices for unfolding the solar panel sections of a solar panel collector of a satellite are known. The solar panels or wings comprise each at least three panel sections which are hinged to each other and which may be folded into a packet. At least one panel section forms an outer wing or panel portion which can be unfolded partially independently of the unfolding of the remaining panel sections. In the unfolded condition the outer wing or panel section extends approximately at a right angle relative to the inner wing, the sections of which are still in a packet. Separately operable hold down members are provided for the partial unfolding and the subsequent, complete unfolding. The unfolding force or moment is produced by or provided by elastic power storage devices which are effective, for example, on the panel hinges. Such power storing devices may, for example be mechanical springs.

The division of the solar cell panel of the solar collector into several wings symmetrically distributed around the circumference of a satellite has been found to be quite reliable in practice. Each of the solar collector wings comprises several panel sections which are hinged to each other and tb the body of the satellite. These panel sections of each wing can be folded into a compact package. During the launching of the satellite on a carrier rocket the solar collector wings are folded into package form so that the take up little space and so that they are further able of taking up the high mechanical loads, or rather stresses, occurring during launching.

In outer space it is frequently necessary that initially a portion of the maximally produceable solar energy is available for use. In such instances it is customary to unfold only the outer ends of the wings, that is, generally, the respectively outermost panel section is partially unfolded into a position of about 90° relative to the plane of the package of the remaining panel sections. Thus, the partially unfolded outer wing or panel sections are located in a plane facing the sun. When the satellite is taken into a full operation, the already partially unfolded wing or panel sections are tilted through a further 90° angle for a full unfolding while the so far still packeted or folded collector panel sections are also released for complete unfolding. The unfolding takes place with power storage devices that is, springs of any suitable type or through suitable motors. The release of the unfolding motion is accomplished by hold down members which are releasable for the unfolding and which keep the folded state when they are not released. Separate stop members are provided for interrupting the unfolding motion where only a partial unfolding is intended.

It is also known to lock the hinging elements arranged between neighboring wing or collector panels sections. German Patent (DE-PS) No. 3,215,434 discloses a device suitable for locking the hinge lements when the complete unfolding is accomplished. The separate stop devices include separate stop members specifically provided for stopping the partial unfolding. It has been found that especially these separate stop members for temporarily maintaining the partial unfolding of the outer wing or panel sections have caused trouble in that they become permanent stop members which prevent the further unfolding and thus influence the entire system negatively. Further, the separate stop members have the tendency of being relatively trouble-prone due to their construction which includes separate bearings, release mechanisms, and so forth. Besides, prior art stop members of this type substantially increase the costs of the system.

OBJECTS OF THE INVENTION

In view of the foregoing it is the aim of the invention to achieve the following objects singly or in combination:

to simplify the stop members, especially for maintaining the partial unfolding in such a way that they will not interfere with the intended operation of the satellite;

to reduce substantially the costs for the unfolding mechanism, especially for the partially unfolding mechanism of a solar collector wing; and to avoid the use of separate power storage elements and separate unlocking devices for the stop elements, especially the stop elements which maintain the partial unfolding of solar panel sections, for example in a satellite.

SUMMARY OF THE INVENTION

According to the invention the innermost panel section of the outer wing portion and the next but one panel section of the inner panel or wing portion are provided with rigid stop members extending approximately in an extension of the panel section plane. The outer stop member has an effective lateral surface and the inner stop member has an effective facing surface so arranged that the two surfaces cooperate or contact each other in the partially unfolded state. The cooperating surfaces of the two rigid stop members are so shaped that the first stop cannot clear the second stop when unfolding forces are not effective. However, when such unfolding forces are further applied for the complete unfolding, the cooperation of the two stop member surfaces permits the further unfolding in that the first stop member can clear the second stop member.

The following advantages have been achieved by the invention. The unfolding force components can remain the same as in the prior art. Similarly, the hold down members for the outer solar collector portion and for the inner solar collector portion can remain as heretofore. However, the locking and unlocking means separately provided heretofore for the stopping of the partially unfolded outer solar section now merely require two rigid stops which perform two functions, namely the stopping function after the partial unfolding is completed and the release function when the complete unfolding begins. When the inner collector portion with its several sections is released for the full unfolding, the two stop members can clear each other so that the inner collector portion or section can also completely unfold. The construction of these stops is exceedingly simple and hence they can be made rather robust. Separate bearings or hinge joints have been avoided, whereby any jamming or seizing is also avoided. Further, separate springs that are subject to aging and which can break, are also avoided.

By providing one of the cooperating surfaces as a curved cam surface, it is assured that the interaction and frictional conditions of the cooperating surfaces are advantageous in that jamming and seizing is avoided by the resulting knuckle-joint type of action.

BRIEF DESCRIPTION OF THE DRAWINGS

In order that the invention may be clearly understood, it will now be described, by way of example, with reference to the accompanying drawings, wherein.

DETAILED DESCRIPTION OF A PREFEFRED EXAMPLE EMBODIMENT AND OF THE BEST MODE OF THE INVENTION

Figure 1:
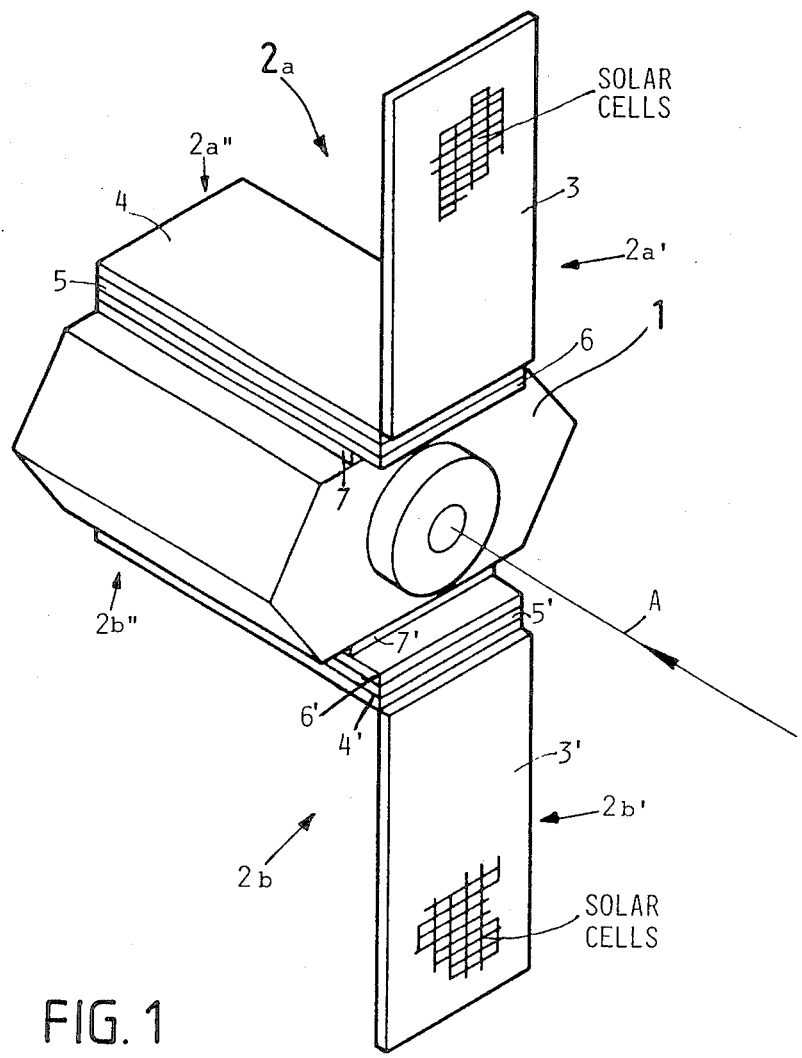
FIG. 1 is a perspective view of a conventional satellite shown with two sets of solar collector panel sections. each set has two portions and each portion has a number of sections, two outer sections being shown in the partially unfolded state.

FIG. 1 illustrates a conventional satellite 1 equipped, for example, with two symmetrically arranged solar collector panels or wings 2a and 2b. Each collector panel or wing comprises an outer panel portion 2a' and 2b' and an inner panel portion 2a'' and 2b''. The words "outer" and "inner" as used in this context denote the location of the panel portions relative to the satellite body 1. Thus, the inner panel portions 2a'' and 2b'' are closer to the satellite body than the outer panel portions 2a' and 2b°. In FIG. 1 each outer panel portion 2a' and 2b' comprises one solar collector panel section 3 and 3' shown in a partially unfolded condition in which these panel sections 3 and 3' extend approximately perpendicularly to the longitudinal axis A of the satellite body 1. The inner panel portions 2a'' and 2b'' each comprise a plurality of panel sections 4, 5, 6, and 7 as well as 4' 5' 6', and 7'. All panel sections are interconnected by conventional hinges not shown to permit the unfolding operation. The innermost sections are hinged to body 1.

Each panel section carries a plurality of solar collector cells facing the sun. The longitudinal axis A of the satellite would be directed toward the sun. The ratio of the solar energy collectable in the partially unfolded state shown in FIG. 1 to the total solar energy collectable when the solar collector panels are all fully unfolded depends on the area ratio of the panel sections 3, 3' to the total surface area of all panel sections in the fully unfolded state of both panels or wings 2a, 2b.

Figure 2:
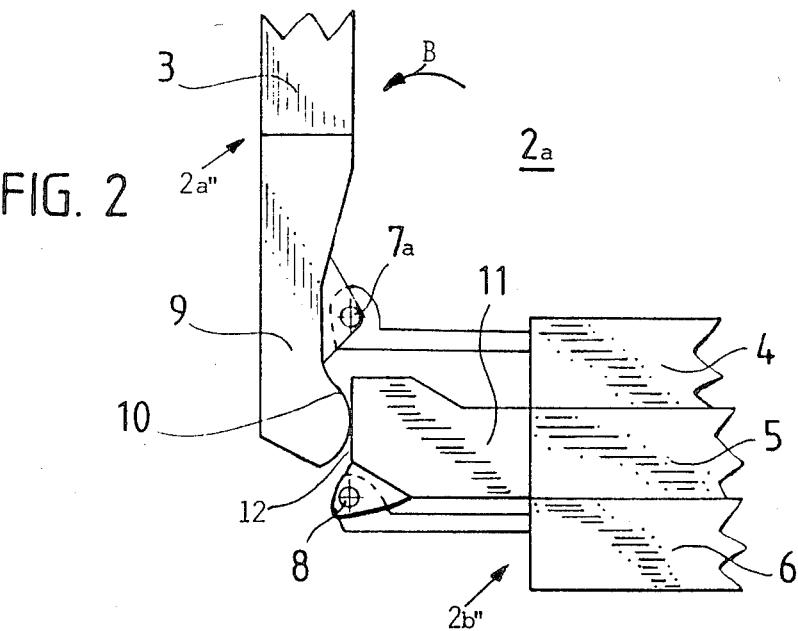
FIG. 2 is a side view of the cooperating stop members between an outer collector section and an inner collector section after the partial unfolding, whereby the two stop members engage each other for maintaining the partially unfolded state.
Figure 3:
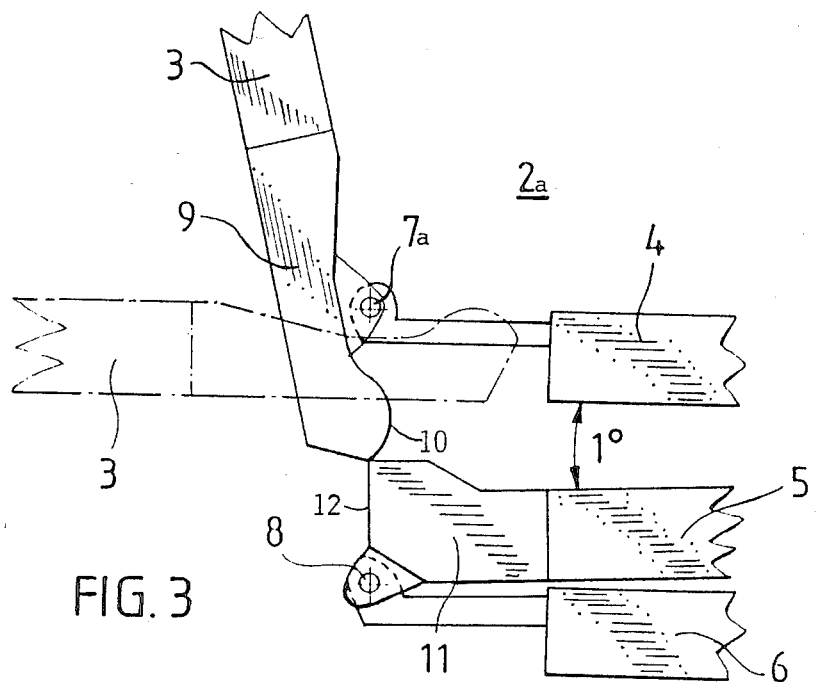
FIG. 3 is a view similar to that of FIG. 2, but showing the further unfolding operation in which the outer collector panel or wing section begins to travel in a counterclockwise direction to eventually reach the dash-dotted position in the fully unfolded state.

FIGS. 2 and 3 show the features of the invention for maintaining a partially unfolded state as shown in FIG. 2 and for permitting the further unfolding into a fully unfolded state as shown in FIG. 3.

In FIG. 2 the single panel section 3 of the outer panel portion comprises according to the invention, a first stop member 9 provided with a curved cam surface 10 and hingedly connected to a hinge or journal member 7a for tilting in a counterclockwise direction as indicated by the arrow B. Initially, the panel section 3 in the folded state, extends in parallel to the panel sections 4, 5, and 6 of the inner panel portion 2b''. In order to assume the position shown in FIG. 2, it is necessary to release the hold down members of the panel section 3, whereupon a power storage device such as a spring or the like moves the panel section 3 counterclockwise through an angle of approximately 90°. The hold down member, its release mechanism, and the power storage means for this partial unfolding are not shown in FIG. 2 since these elements are conventional. The panel sections 4, 5, and 6 which do not participate in the partial unfolding, are also conventionally interconnected by the respective hinging means and by rope and pulley drives for the final unfolding. Since the invention is not concerned with these drives and since they are conventional they are not shown. The panel 5 which is the second panel from the outside in, is equipped with a second stop member 11 having a plane stop surface 12 for cooperation with the curved cam surface 10 in the partially unfolded state. The torque in the hinge or journal 7a which is effective in the direction of the arrow B, is just sufficient to hold the stop surface 10 against the stop surface 12 to maintain the partially unfolded state as long as the hold down members still hold the panel sections 4, 5, and 6 in the folded condition. The two stop members 9 and 11 are so located that in the partially unfolded state the panel sections 3 and 3' assume an angle of approximately 90° relative to the plane defined by the panels 4, 5, and 6. However, the stop members 9 and 11 may also be shaped and located to assure a different angle than 90° in the partially unfolded state.

For generating, or rather collecting, the maximally possible energy it is necessary to move the panel section 3 from the position shown in FIG. 2 into the position shown in dash-dotted lines in FIG. 3, and to also unfold the panel sections 4, 5, and 6 completely. For this purpose, any remaining hold down members are released and the force storage means such as springs which apply the required torque in the hinge or journal 8 become effective for the complete unfolding. The instantaneous opening angles between the panels 4, 5, and 6 are always equal to one another due to the above mentioned conventional rope and pulley drives. As shown in FIG. 3, a very small opening angle of about 1° between the panel sections 4 and 5 is sufficient to provide a relative displacement of the panel sections 3 and 5 to bring the surfaces 10 and 12 of the stop members 9 and 11 out of engagement with each other, whereby the operation is comparable to that of a knuckle-type joint. The full line position illustrated in FIG. 3 shows this condition in which the further unfolding may take place. After release, the panel section 3 may be further unfolded in the clockwise direction to assume the dash-dotted position. The other panel or wing operates in the same way.

Although the invention has been described with reference to specific example embodiments, it will be appreciated that it is intended to cover all modifications and equivalents within the scope of the appended claims.

What I claim is:

1. An apparatus for maintaining a partially unfolded state of a solar panel section forming part of a solar panel having a plurality of panel sections hinged to each other and to a body such as a satcllite, comprising a first rigid stop member (9) extending inwardly from an outer panel section (3), relative to said body, a second rigid stop member (11) extending outwardly from an inner panel section (5), said first and second rigid stop members (9, 11) having cooperating surface configurations (10, 12) which contact each other during a partially unfolded state for maintaining said partially unfolded state, said cooperating surface configurations being so shaped that said first stop member can clear said second stop member for permitting a further unfolding of said solar panel in response to an unfolding force.

2. The apparatus of claim 1, wherein said surface configuration (10) of said first stop member (9) has a curved cam surface, and wherein said surface configuration (12) of said second stop member (11) is a plane surface engaging said curved cam surface of said first sto member for maintaining said partially unfolded state and for permitting said curved cam surface to roll along said plane surface in response to said unfolding force.

3. The apparatus of claim 2, wherein said curved cam surface forms part of a circular cylinder jacket.

4. The apparatus of claim 1, wherein said first rigid stop member (9) extends approximately in a plane defined by said outer panel section, and wherein said second stop member (11) extends approximately in a plane defined by said inner panel section.

5. The apparatus of claim 4, wherein said solar panel comprises an outer panel portion including said outer panel section as an innermost panel section of said outer panel portion, and an inner panel portion including a plurality of panel sections of which said inner panel section is the next but one panel section of said inner panel portion, all relative to said body.

* * * * *